(12) United States Patent
Nader

(10) Patent No.: US 7,357,865 B1
(45) Date of Patent: Apr. 15, 2008

(54) AUTOMATIC TRANSMISSION FLUID FILTRATION SYSTEM

(75) Inventor: Gregg A. Nader, Libertyville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 481 days.

(21) Appl. No.: 10/958,280

(22) Filed: Oct. 4, 2004

Related U.S. Application Data

(60) Provisional application No. 60/508,596, filed on Oct. 3, 2003.

(51) Int. Cl.
*B01D 35/027* (2006.01)
*B01D 35/02* (2006.01)
*F16N 39/06* (2006.01)
*F01M 1/10* (2006.01)
*F01M 11/03* (2006.01)

(52) U.S. Cl. ............. 210/232; 210/130; 210/132; 210/167.08; 210/316; 210/416.5

(58) Field of Classification Search ........... 210/232, 210/167.08, 132, 130, 316, 416.5
See application file for complete search history.

(56) References Cited

U.S. PATENT DOCUMENTS 3,056,501 A * 10/1962 Thorman et al. ........... 210/132
4,496,460 A * 1/1985 Haarstad et al. ........... 210/132
5,314,616 A * 5/1994 Smith ........................ 210/130

OTHER PUBLICATIONS

"Automatic Transmission Hydraulic System Cleanliness—The Effects of Operating Conditions, Measurement Techniques and High-Efficiency Filters", by Pierre Nieuland and Timothy A. Droste, Journal of Society of Automotive Engineers, 2001-01-0867.

* cited by examiner

Primary Examiner—Thomas M. Lithgow
(74) Attorney, Agent, or Firm—Clifford F. Rey

(57) ABSTRACT

An automatic transmission fluid (ATF) filtration system that combines both coarse filtering mesh and microfine depth filtering elements simultaneously to remove a wide range of particulate matter, but also maintains an unrestricted flow of ATF to the pump to ensure its volumetric efficiency is disclosed. In the present invention ATF at system pressure is delivered via a hydraulic circuit to a microfine depth filtering element for depth filtration (i.e. several layers of filter media) and, thereafter, is passed into the intake of the coarse filter element or, alternatively, between the intake of the coarse filter element and the pump intake. Because ATF flow through the coarse filter element is continuous and independent of the microfine depth filter element, the volumetric efficiency of the pump is maintained in all phases of operation even at the highest demand points such as at cold start-up, hot idle, and high volume/demand situations.

14 Claims, 5 Drawing Sheets

AUTOMATIC TRANSMISSION FLUID FILTRATION SYSTEM

CROSS-REFERENCE TO RELATED APPLICATIONS

This application claims the benefit under 35 U.S.C. 119(e) of U.S. Provisional Patent Application No. 60/508,596 filed Oct. 3, 2003 entitled Automatic Transmission Fluid Filtration System.

BACKGROUND OF INVENTION

The present invention relates to automatic transmissions for land vehicles and, more particularly, to an automatic transmission fluid filtration system for such automatic transmissions.

Maintaining automatic transmission fluid (hereinafter "ATF") in a clean condition free of particulates and contamination is critical to the proper function of an automatic transmission. Most automatic transmissions and transaxles use a standard wet sump system where the ATF drains by gravity into the pan and the pump takes it up directly and discharges it to the hydraulic system. In a typical automotive application an ATF filter is submerged in the pan in fluid communication with the transmission pump. As the pump rotates ATF is drawn from the sump and through the filter by vacuum into the suction port of the pump.

Pumps in automatic transmission hydraulic systems are typically positive displacement pumps driven at engine speed. A positive displacement pump is one, which has the same output per revolution regardless of pump speed or pressure already developed in the system. Given the continuous flow requirements of the hydraulic system, a consistent flow of ATF through the filter to the pump is critical to proper lubrication and function of the transmission. Thus, the sump must have sufficient ATF at all times to keep the filter and pump intake covered in order to prevent air from being drawn into the pump. If the pump intake is exposed and air is permitted to enter the pump, line pressure may drop enough to cause the clutches to malfunction.

Because a sump filter is on the inlet side of the pump, it must not restrict ATF uptake to the pump. This is a particular problem during cold start-up, hot idle, and high volume/demand situations. Thus, it will be appreciated that the ATF filter has conflicting functions (i.e. it must flow freely, but it must remove harmful contaminants). The present ATF filtration system has been developed to balance filtration efficiency with the desired cleanliness level.

SUMMARY OF THE INVENTION

Accordingly, the present invention is a automatic transmission fluid filtration system that combines both coarse mesh and microfine depth filtering elements, which function simultaneously to remove a wide range of particulate matter (i.e. as small as 5 microns) from the ATF, but also maintain an unrestricted flow of ATF to the pump to ensure its volumetric efficiency.

In the present invention ATF at system pressure is delivered via a hydraulic circuit to a microfine depth filtering element for depth filtration (i.e. ATF is passed through several layers of filter media) and, thereafter, is passed into the intake of the coarse filter element or, alternatively, between the intake of the coarse filter element and the suction side of the pump. Because ATF flow through the coarse filter element is continuous and independent of the microfine depth filter element, the volumetric efficiency of the pump is maintained in all phases of operation even at the highest demand points such as at cold start-up, hot idle, and high volume/demand situations.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Prior to describing the present invention in detail, it may be beneficial to briefly discuss the structure and function of a conventional ATF filter in an automatic transmission. With further reference to the drawings there is shown an illustration of such a conventional ATF filter, indicated generally at 100, within the sump of an automatic transmission. The ATF filter 100 is comprised of a housing 105, which is submerged below the ATF level as at 115 in the pan 120. Housing 105 is disposed in fluid communication via suction tube 102 with the transmission pump, indicated generally at 125 and shown in FIG. 2, attached to the transmission case (not shown).

Figure 1:
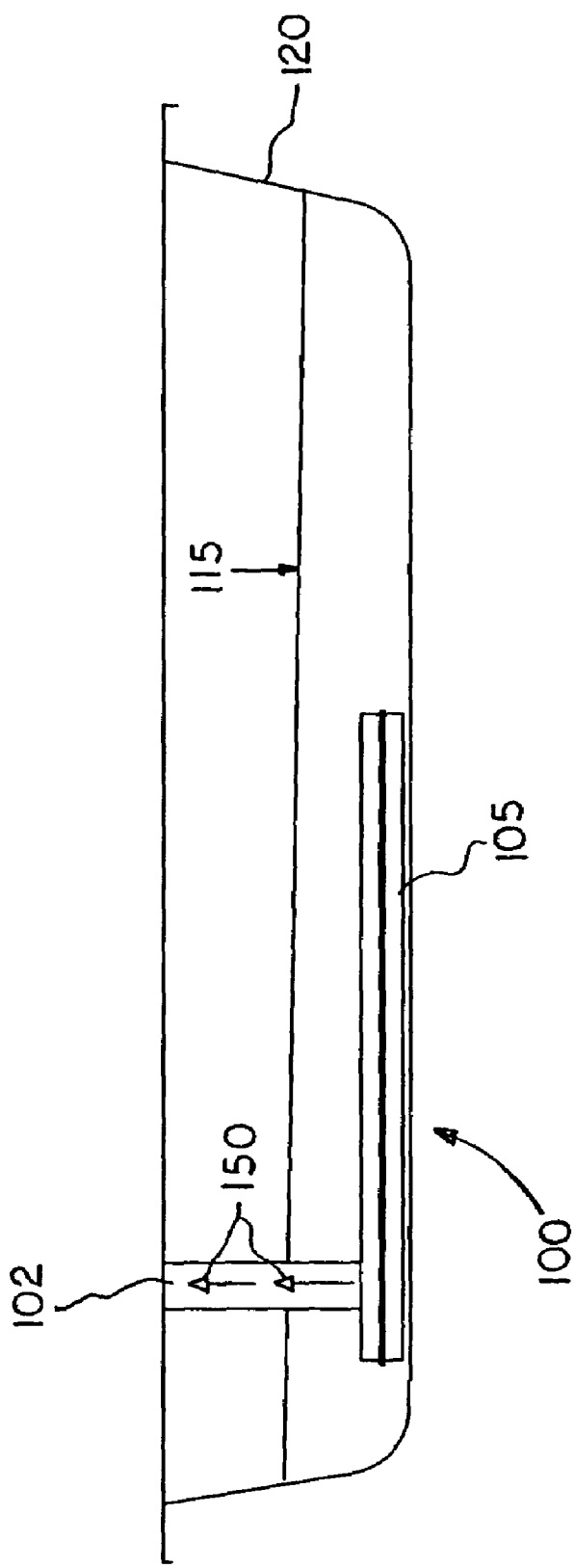
FIG. 1 is cutaway view of the sump of an automatic transmission showing the position of an ATF filter and is labeled Prior Art.
Figure 2:
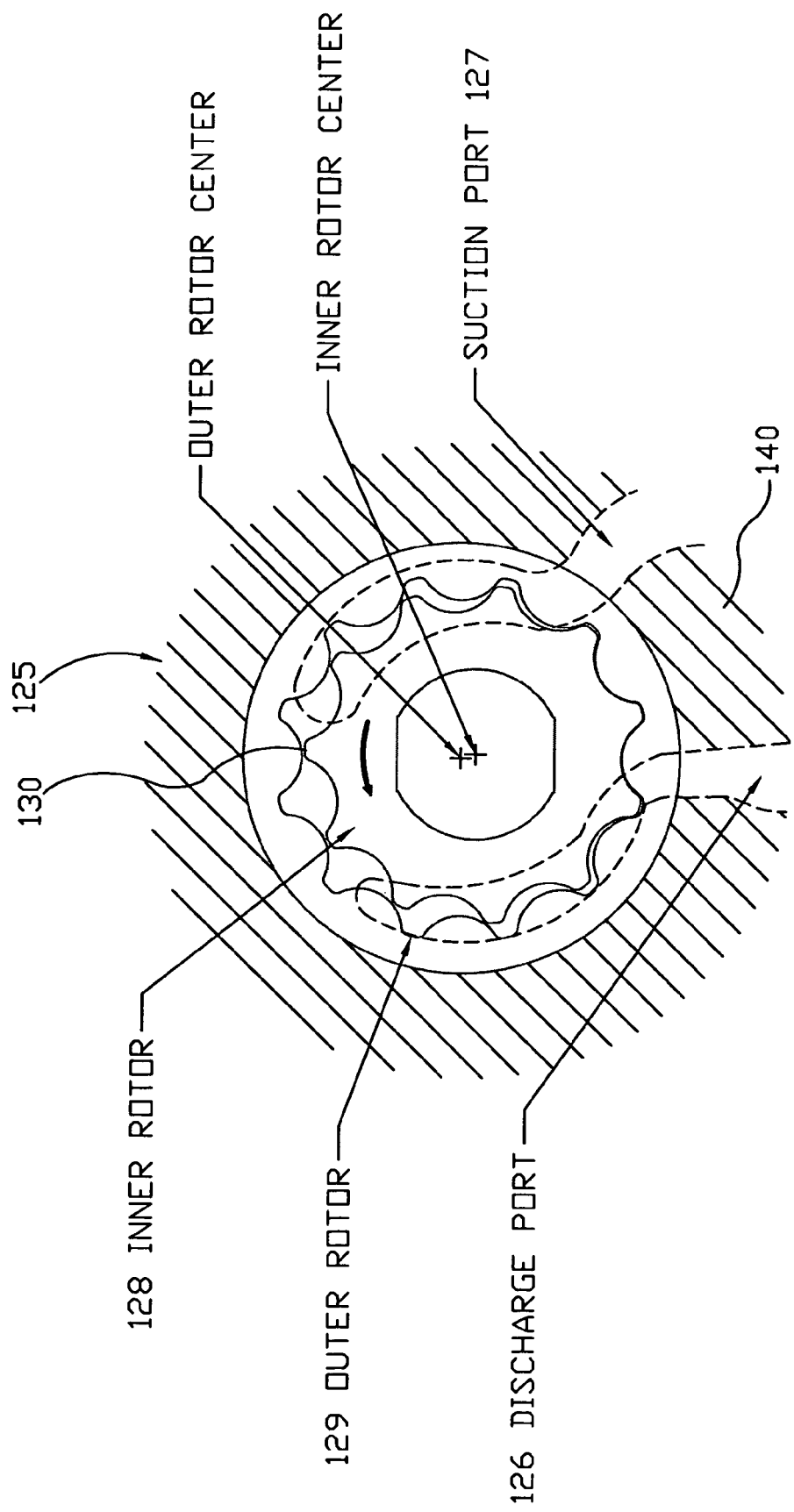
FIG. 2 is a plan view of a fixed displacement, Gerotor type ATF pump as installed within the pump body and is labeled Prior Art.

A positive displacement pump 125 of the Gerotor type is shown in FIG. 2 for purposes of explanation. Of course, other types of positive displacement pumps such as gear pumps and vane pumps may be utilized with the present invention. In the Gerotor type pump 125 as the inner rotor 128 turns each of its teeth maintains continuous line contact with a tooth of the outer rotor 129, the point of contact shifting from the flanks of the teeth 130 at full mesh to the tops of the teeth upon rotation as shown by the directional arrow. In this way a pumping action is developed. Passages or ports 126, 127 are required in the pump body 140 to carry ATF into the suction side and away from the discharge side of the pump 125 to the hydraulic system. Rotation of the pump 125 at engine speed generates vacuum within the suction port 127, which draws ATF from the pan 120 through primary inlet 135 and the filter element 110 via suction tube 102 as shown by directional arrows 150 (FIG. 3).

Figure 3:
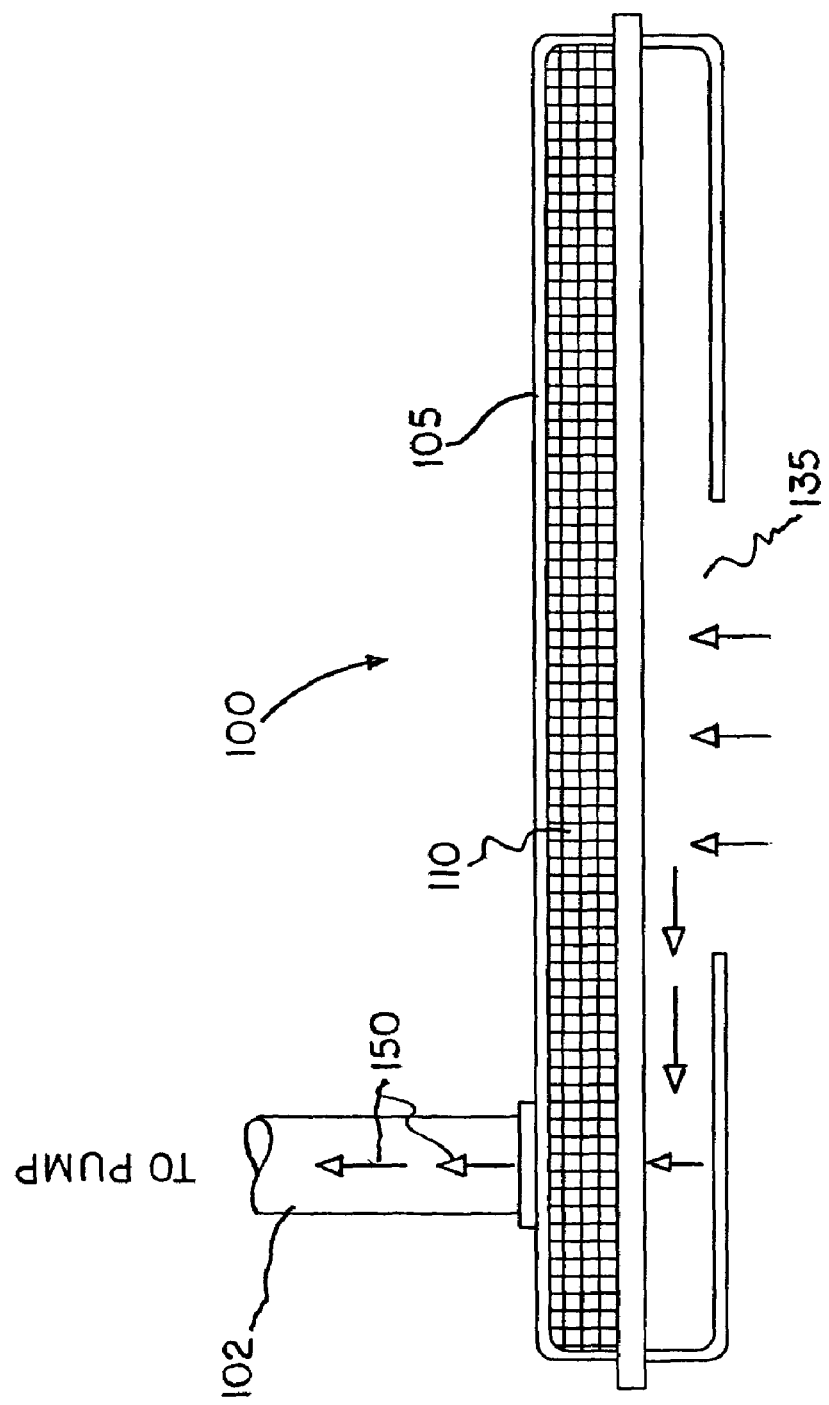
FIG. 3 is a partially cutaway view of an OEM filter housing and is labeled Prior Art.

As shown in FIG. 3 the original equipment manufacture (hereinafter "OEM") ATF filter typically contains a filter element 110 that is rated in the range of 25-100 microns, through which ATF must pass en route to the pump 125. A micron rating is a generalized way of indicating the ability of the filter element 110 to remove contaminants by the size of the particles. The importance of removing even the smallest particles to extend the operating life of ATF and components has been well established. But the micron rating does not properly and fully describe either the efficiency or the contaminant-holding capacity of the filter.

Component wear is directly related to the cleanliness level of the system (the cleaner the fluid, the less wear) i.e. to the number of solid particles in the ATF. Not only large particles with diameters roughly equal to the micron rating, but also sludge particles smaller than 5 microns can cause significant damage, break downs, and generally degrade the ATF.

The media utilized in the OEM filter element 110 is the physical mechanism used for contamination control. The media utilized in OEM filter elements ranges from mesh screens to synthetic microfibers blended in various configurations. Media construction and filter configuration are used to determine the filter's efficiency for particle removal and must be balanced against the pressure drop, or resistance to flow, which are a normal consequence of filtration.

Because a sump filter in an automatic transmission is on the inlet side of the pump, it must guarantee a restriction-free flow of ATF to the hydraulic system. This is a particular problem during cold start-up, hot idle, and high volume/demand situations. Thus, it will be appreciated that the ATF filter has conflicting functions (i.e. it must flow freely, but it must remove harmful contaminants). The present ATF filtration system has been developed to balance filtration with the desired cleanliness level and will now be described in detail.

Figure 4:
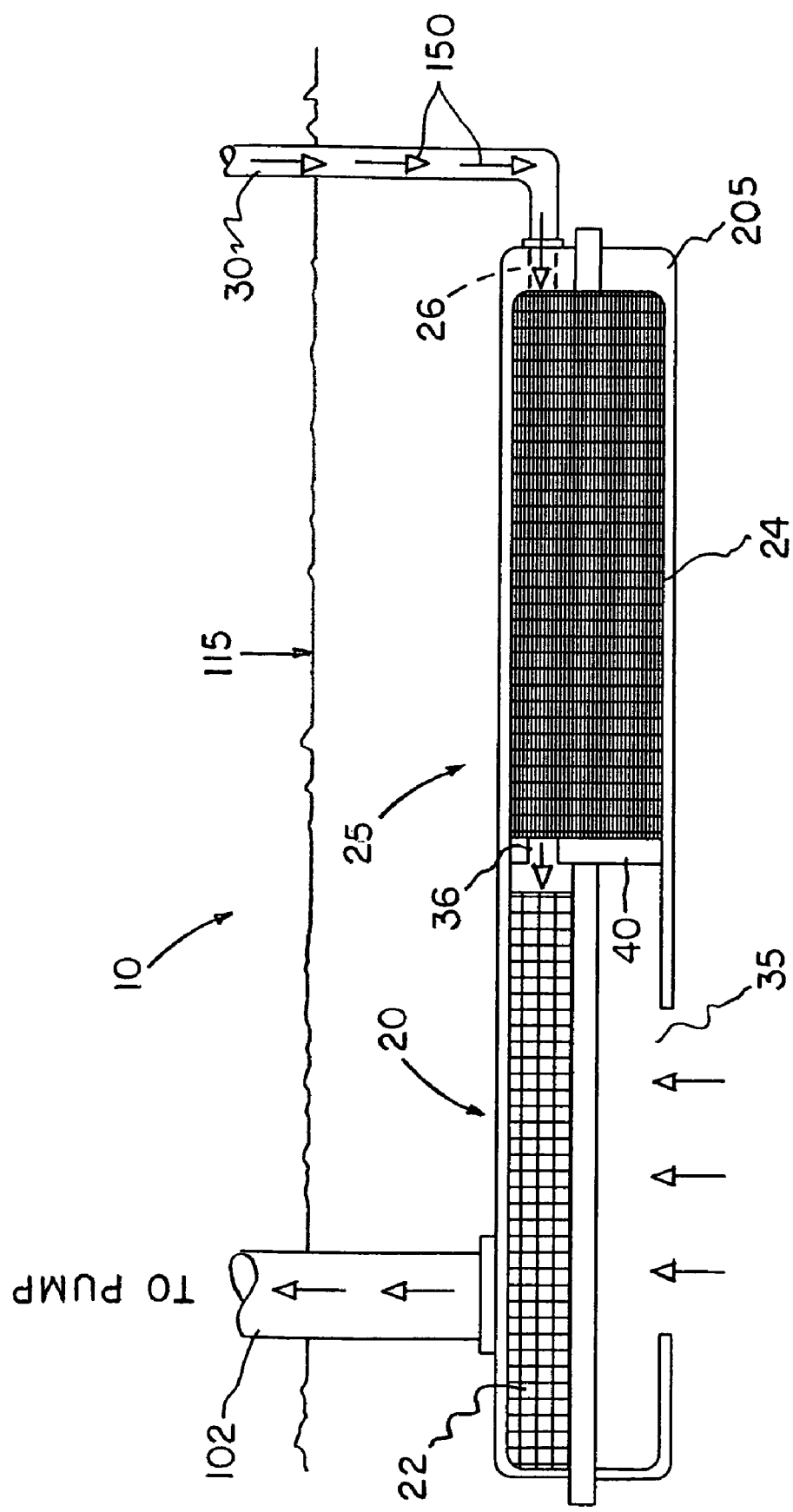
FIG. 4 is a partially cutaway view of one embodiment of the ATF filtration system of the present invention.

The present ATF filtration system provides structures and functional features, which comprise, in part, microfine depth filtering means including, but not limited to, the following structures. Referring to FIG. 4, the present invention provides an ATF filtration system, indicated generally at 10, that combines both a coarse mesh filtering element, indicated generally at 20, and a microfine depth filter, indicated generally at 25, including filter media 24 which function simultaneously to remove a wider range of particle sizes and contaminants from the ATF to improve cleanliness. In the present invention ATF is forced at system pressure (i.e. less than a maximum of 100 psi) through the microfine depth filter 25 independently of ATF taken up directly by the pump via the primary inlet 35 in the filter housing 205.

In the embodiment shown in FIG. 4, the microfine depth filter 25 is integrated into the filter housing 205. After the ATF passes through the microfine depth filter 25, it is delivered to the coarse mesh element 20 as shown in FIG. 4 via a secondary inlet 36, which extends through an interior partition 40 located within the filter housing 205. Alternatively, after passing through the microfine depth filtering element 25 ATF may be returned to the system at a position between the coarse mesh element 20 and the suction side of the pump 125 or directly to the wet sump.

Figure 5:
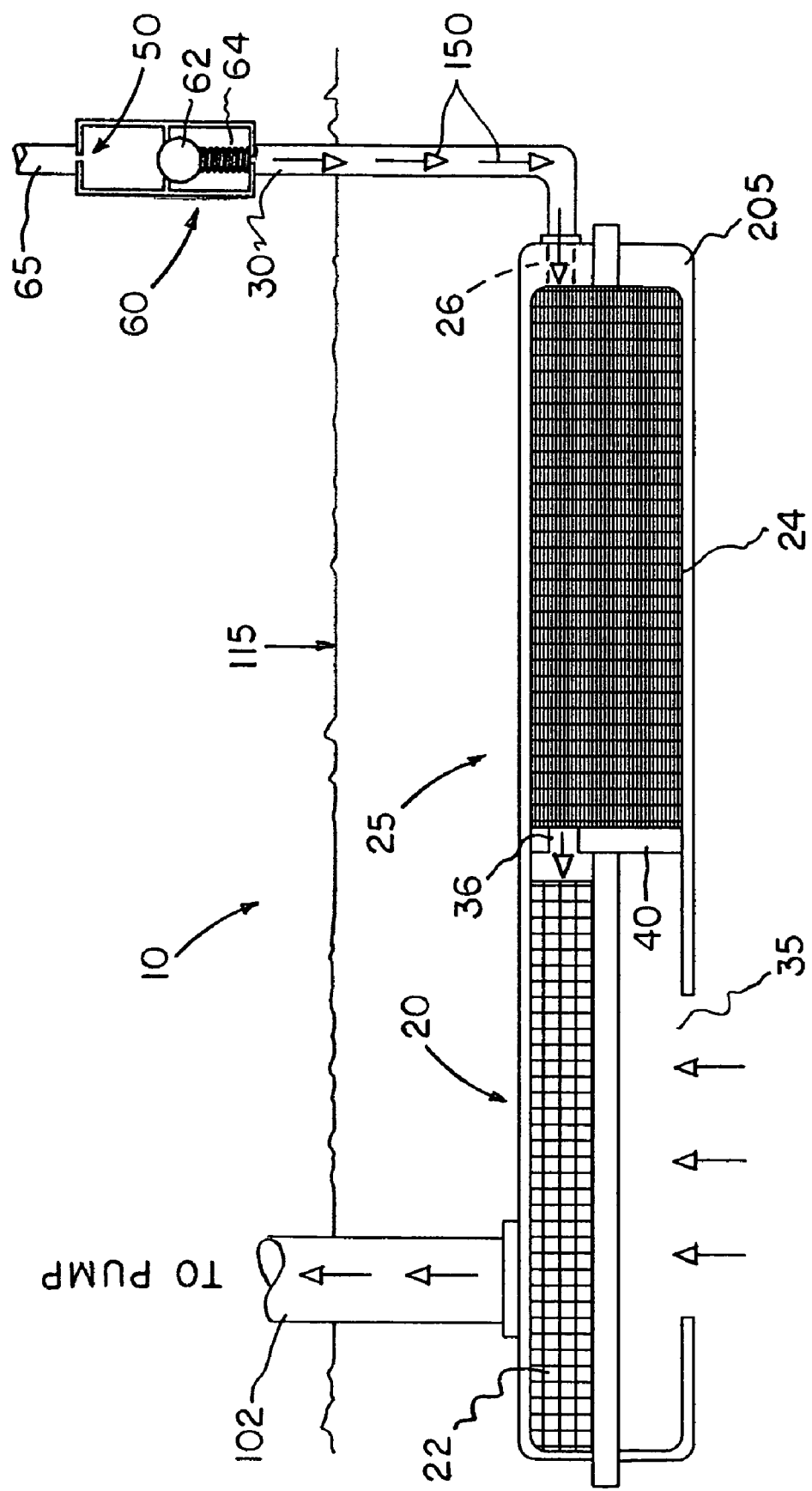
FIG. 5 is a partially cutaway view of another embodiment of the present ATF filtration system.

In an alternative embodiment (FIG. 5) the present filtration system may also include a calibrated orifice, indicated generally at 50, and a pressure relief valve, indicated generally at 60, disposed within the pressure circuit feeding the microfine depth filter element 25. In the embodiment shown pressure relief valve 60 is comprised of a ball bearing 62 and compression spring 64 arranged as illustrated to permit ATF flow in one direction only as indicated by arrows 150.

Orifice 50 functions to control the volume of ATF delivered to the microfine depth filter 25. This determines the specific demand of ATF volume from the hydraulic system during normal operation and checks flow if the microfine depth filter 25 ruptures or otherwise leaks. The pressure relief valve 60 functions to prevent ATF flow to the microfine depth filter 25 below a predetermined pressure such as when the engine is at idle speed. Engine idle speed is a critical design point where the output volume of the pump is at its lowest. As the engine speed increases and pump output and ATF pressure increase, then the pressure relief valve 60 will open and ATF will flow to the microfine depth filter 25.

In an alternative embodiment the microfine depth filter is provided separately in an aftermarket kit (not shown) including a microfine depth filter cartridge, tubing, orifice, pressure relief valve, installation tools and instructions, which can be used in conjunction with an existing OEM filtration system.

In a preferred embodiment the filter media 24 utilized in the microfine depth filtering element 25 ranges from microfine mesh, synthetic fibers, cellulose fibers, and/or multi-layer media in various configurations for a given transmission application. The microfine depth filter element 25 is designed to capture particles as small as 5 microns, which are not visible without magnification. It has been determined that particulates in this size range can be damaging to the hydraulic system and that removing such contaminants will prevent early system failure and/or continuing system leakage problems.

Advantageously, the present filtration system also maintains a constant, unimpeded flow of ATF to the pump 125 via the coarse mesh filtering element 20 to ensure the volumetric efficiency of the pump. The coarse mesh filtering element 20 is constructed of a relatively coarse mesh material 22 designed to capture particles in the 50-90 micron range. The coarse mesh material 22 is utilized to avoid any pressure drop, or resistance to flow, which typically occurs when using the OEM filters 100 at critical design points such as at cold start-up and hot idle in many OEM hydraulic systems.

In addition, filter media 24 within the microfine filter element 25 may be designed such that the filter media itself restricts fluid flow and will not permit any appreciable ATF flow through the filter element 25 below a predetermined fluid pressure to ensure adequate system pressure is maintained.

In practical use the present filtration system is utilized in direct replacement of any serviceable OEM filter 100 (FIG. 3). In a method of the present invention, the serviceable OEM filter 100 is initially removed during maintenance and/or overhaul operations. Next, a filtration system 10 in accordance with the present invention is selected which meets or exceeds the target operating cleanliness for a given automatic transmission to be retrofitted. Next, the present filtration system 10 is installed in the hydraulic system by tapping into a selected hydraulic circuit on the pressure side of the pump 125. Tubing 65 and fittings (not shown) are connected to divert ATF at system pressure to the microfine depth filter 25 via orifice 50 and pressure relief valve 60. Finally, the housing 205 including the filters 20, 25 is positioned within the sump and connected to suction tube 102.

Although not specifically illustrated in the drawings, it should be understood that additional equipment and structural components will be provided as necessary and that all of the components described above are arranged and supported in an appropriate fashion to form a complete and operative Automatic Transmission Fluid Filtration System incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An automatic transmission fluid filtration system for use within the hydraulic system of an automatic transmission of a land vehicle, said hydraulic system further including a hydraulic pump for generating a predetermined system pressure, said pump having a suction circuit and a pressure circuit, said hydraulic system including a wet sump wherein said automatic transmission fluid drains by gravity, said hydraulic system further including an original equipment fluid filter disposed within said wet sump in fluid communication with said suction circuit, said filtration system comprising:
   a replacement fluid filter disposed within said wet sump, wherein said replacement fluid filter includes a filter housing having an interior partition therein, said filter housing having an inlet in fluid communication with said pressure circuit and an outlet in fluid communication with said suction circuit;
   a coarse mesh filter element disposed within said filter housing, said coarse mesh filter element including a primary intake submerged within said wet sump in fluid communication with said suction circuit, said coarse mesh filter element further including a secondary intake; and
   a microfine depth filtering means disposed within said filter housing, said microfine depth filtering means having an inlet disposed in fluid communication with said pressure circuit for receiving said fluid at system pressure, said microfine depth filtering means including an outlet disposed in fluid communication with said secondary intake of said coarse mesh filter element, wherein said microfine depth filtering means carries out microfine particle filtration independently of said coarse mesh filter element such that volumetric efficiency of said pump is maintained in all phases of operation.

2. The automatic transmission fluid filtration system of claim 1 wherein said microfine depth filtering means includes filter media capable of capturing particles as small as five microns.

3. The automatic transmission fluid filtration system of claim 2 wherein said filter media is designed to restrict the flow of said fluid through said microfine depth filtering means when said fluid is below a predetermined minimum pressure.

4. The automatic transmission fluid filtration system of claim 2 wherein said filter media is selected from the group consisting of microfine mesh, synthetic fibers, and cellulose fibers.

5. The automatic transmission fluid filtration system of claim 1 including a pressure relief valve having a calibrated orifice disposed in said pressure circuit upstream of said microfine depth filtering means to prevent said fluid from passing into said microfine depth filtering means when said fluid is below a predetermined pressure.

6. The automatic transmission fluid filtration system of claim 5 wherein said pressure relief valve comprises a ball bearing seated against said calibrated orifice, wherein said ball bearing is spring biased to a closed position by a compression spring to permit said fluid to flow through said pressure relief valve in only one direction.

7. The automatic transmission fluid filtration system of claim 1 wherein said coarse filter element includes filter media capable of capturing particles in the range of 50 to 90 microns.

8. The automatic transmission fluid filtration system of claim 1 wherein said fluid passes from said outlet directly to said wet sump.

9. The automatic transmission fluid filtration system of claim 1 wherein said fluid passes from said outlet to a location intermediate said coarse mesh filter element and said suction circuit.

10. An aftermarket automatic transmission fluid filtration system for use in combination with an original equipment hydraulic system of an automatic transmission of a land vehicle, said hydraulic system further including a hydraulic pump for generating a predetermined system pressure, said pump having a suction circuit and a pressure circuit, said hydraulic system including a wet sump wherein said automatic transmission fluid drains by gravity, said hydraulic system further including an original equipment fluid filter disposed within said wet sump in fluid communication with said suction circuit, said filtration system comprising:
   a replacement fluid filter disposed within said wet sump, wherein said replacement fluid filter includes a filter housing having an interior partition, said filter housing having an inlet in fluid communication with said pressure circuit and an outlet in fluid communication with said suction circuit;
   a coarse mesh filter element disposed within said filter housing, said coarse mesh filter element including a primary intake submerged within said wet sump in fluid communication with said suction circuit, said coarse mesh filter element further including a secondary intake;
   a microfine depth filtering means disposed within said filter housing, said microfine depth filtering means having an inlet disposed in fluid communication with said pressure circuit for receiving said fluid at system pressure, said microfine depth filtering means including an outlet disposed in fluid communication with said secondary intake of said coarse mesh filter element, wherein said microfine depth filtering means carries out microfine particle filtration independently of said coarse mesh filter element; and
   a pressure relief valve having a calibrated orifice disposed in said pressure circuit upstream of said microfine depth filtering means to prevent said fluid from passing into said microfine depth filtering means when said fluid is below a predetermined minimum pressure such that volumetric efficiency of said pump is maintained in all phases of operation.

11. The automatic transmission fluid filtration system of claim 10 wherein said microfine depth filtering means includes filter media capable of capturing particles as small as five microns.

12. The automatic transmission fluid filtration system of claim 11 wherein said filter media is selected from the group consisting of microfine mesh, synthetic fibers, and cellulose fibers.

13. The automatic transmission fluid filtration system of claim 10 wherein said pressure relief valve comprises a ball bearing seated against said calibrated orifice, wherein said ball bearing is spring biased to a closed position by a compression spring to permit said fluid to flow through said pressure relief valve in only one direction.

14. The automatic transmission fluid filtration system of claim 10 wherein said coarse filter element includes filter media capable of capturing particles in the range of 50 to 90 microns.

* * * * *